Figure 3:
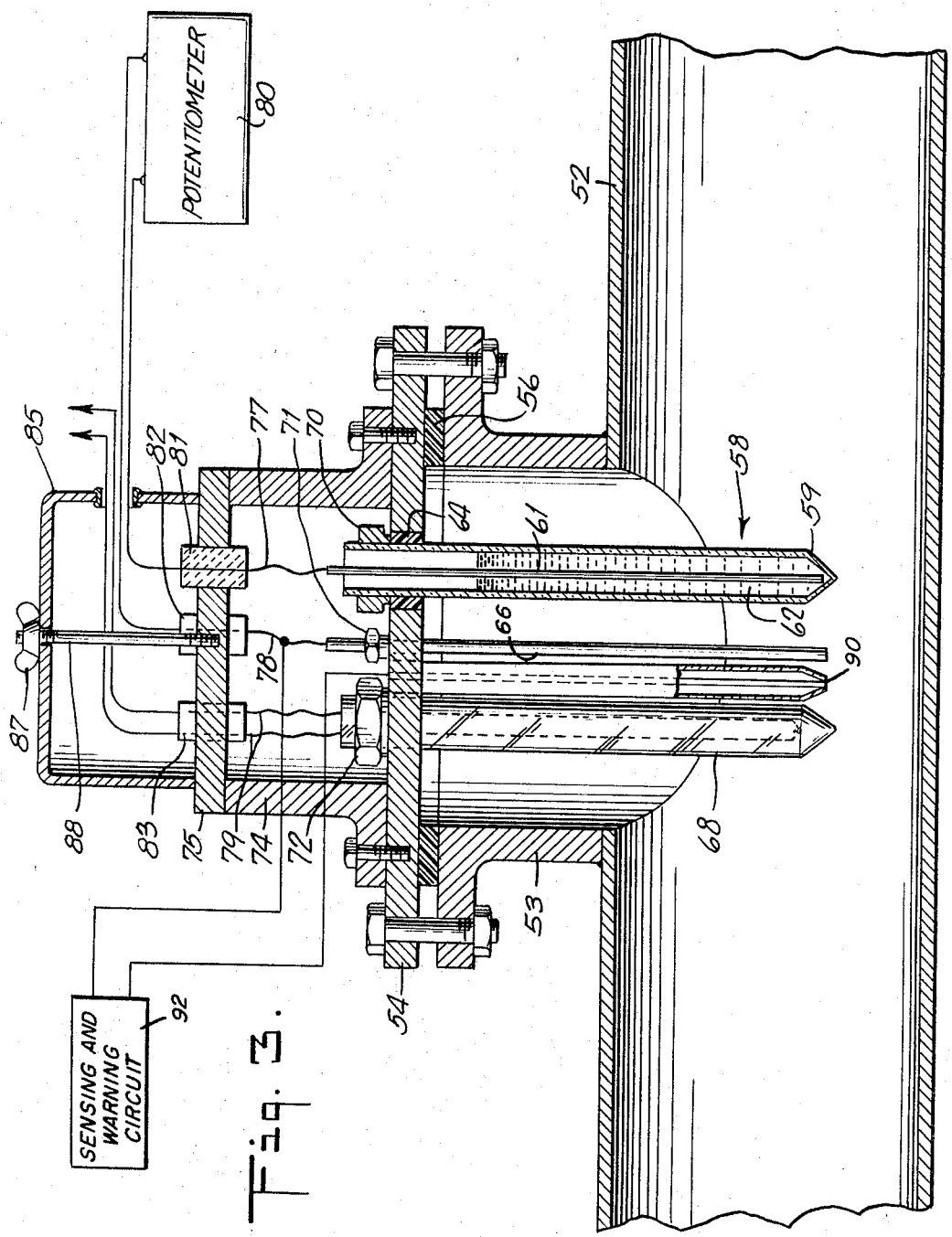

June 6, 1967  E. W. DEWING  3,324,013
METHOD AND APPARATUS FOR DETERMINING COMPOSITION
OF MOLTEN SALT MIXTURES
Filed April 22, 1963  2 Sheets-Sheet 1
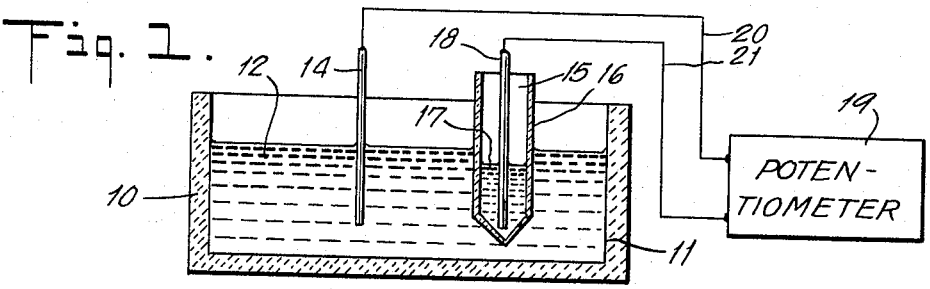
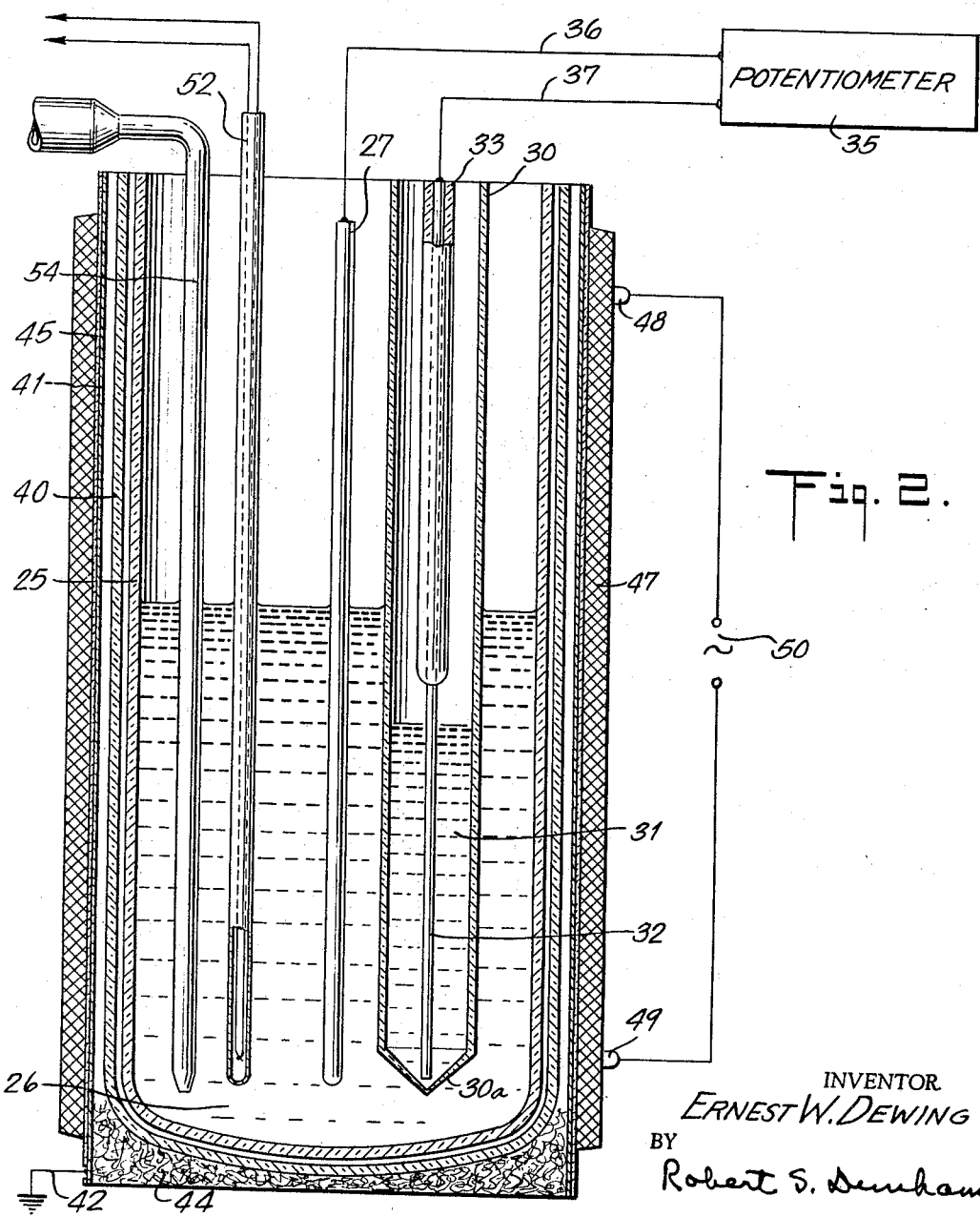
INVENTOR.
ERNEST W. DEWING
BY
Robert S. Denham
ATTORNEY

United States Patent Office 3,324,013
Patented June 6, 1967

3,324,013
METHOD AND APPARATUS FOR DETERMINING COMPOSITION OF MOLTEN SALT MIXTURES
Ernest William Dewing, Arvida, Quebec, Canada, assignor to Aluminium Laboratories Limited, Quebec, Quebec, Canada
Filed Apr. 22, 1963, Ser. No. 274,420
17 Claims. (Cl. 204—1)

This invention relates to apparatus and procedures for determining the composition of molten salt mixtures, and in an important specific aspect is directed to apparatus and procedures for determining the composition of molten mixtures of aluminum chloride and sodium chloride such as may be employed with the so-called aluminum subhalide distillation process. More particularly, in such specific aspect the invention relates to a system and method for determining the relative proportions of aluminum chloride and sodium chloride present in such molten mixtures.

The production of purified aluminum metal from crude aluminum-containing alloys by subhalide distillation, as disclosed for example in United States Patent No. 2,937,082, involves reaction of the alloy with aluminum chloride (i.e. $AlCl_3$) in gaseous state. Thus, aluminum chloride gas is introduced to a heated mass of the alloy in a suitable converter or furnace, preferably as a continuous flow of gas. In a later stage of the distillation system, aluminum chloride gas is discharged; for the sake of convenience and economy of operation, this latter gas is, in accordance with conventional procedures, recycled to the converter for reuse therein. However, the aluminum chloride gas as discharged from the distillation system contains impurities produced in the system, e.g. in gaseous form, such as hydrogen, which tend to build up as the gas is repeatedly recycled, impairing the efficacy of the distillation process. It is therefore desirable to treat the gas, or at least a proportion of it, before returning it to the converter, to remove these impurities therefrom and thus to prevent or control the accumulation of deleterious contaminants in the gas.

A suitable method for effecting purification of such aluminum chloride gas is disclosed in the copending application of Ethan A. Hollingshead and Norman W. F. Phillips, Ser. No. 181,123, filed Mar. 20, 1962, now U.S. Patent No. 3,235,376, entitled, "Procedure and Apparatus for Subhalide Refining of Aluminum," and assigned to the same assignee as the present application, the disclosure of such copending application being understood to be incorporated herein by this reference. This purification method involves the establishment of a molten mixture of sodium chloride and aluminum chloride at an elevated temperature. Aluminum chloride gas as delivered from the distillation system is introduced to this molten mixture in an absorber and is there absorbed in the mixture, i.e. enriching the aluminum chloride content of the molten mixture. The mixture, thus enriched in aluminum chloride, is then passed by suitable means to an evaporator where heat, e.g. supplied by electrical conduction through the mixture between electrodes in the evaporator, elevates the temperature of the mixture to re-evolve a proportion of the contained aluminum chloride as a gas, in a quantity which may desirably be approximately equal to the amount of aluminum chloride gas added to the mixture in the absorber. These steps of absorption and re-evaporation of the aluminum chloride gas effect removal of undesired impurities, so that the gas as evolved from the molten mixture in the evaporator is in suitable condition to be reintroduced to and reused in the subhalide distillation system. After such liberation of aluminum chloride gas, the molten mixture, still containing a proportion of aluminum chloride (e.g. approximately equal to the proportion contained therein before the addition of aluminum chloride to the mixture in the absorber), is recycled by suitable means to the absorber, to absorb additional quantities of impure aluminum chloride gas delivered from the aluminum production system, i.e. for purification and re-evaporation, as before. In this way, contaminated aluminum chloride gas discharged from the subhalide distillation system is purified by absorption in the molten mixture, re-evolved therefrom, and returned for reuse in the distillation system, in a substantially continuous operation.

To establish and maintain satisfactory operation of the above-described purification system, i.e. including the absorber and evaporator employing the molten sodium chloride-aluminum chloride mixture, it is necessary to make determinations (desirably either substantially continuous or at least fairly frequent periodic determinations) of the operating conditions obtainable at one or more points therein. This may be accomplished in a satisfactory manner by determining the relative proportions of sodium chloride and aluminum chloride in the molten mixture at a selected point or points in the purification cycle. By way of example, the proportionate composition of the molten mixture may be determined at the point where it leaves the evaporator. If the mixture as thus analyzed is found to be unduly rich in aluminum chloride at this point, indicating insufficient evolution of gas in the evaporator, the heat in the evaporator could be adjusted upwardly to evolve a greater proportion of the aluminum chloride gas as desired. That is to say, from the information obtained by determining the composition of the mixture at the above-mentioned point, the heat supplied to the evaporator may be satisfactorily regulated to provide continuous operation of the purification system with continuous recycling of aluminum chloride gas in the desired amount. Similarly, other factors in the purification system may also be controlled, to maintain desired operating conditions therein, from the information obtained by analysis of the composition of the mixture at the same or other points in the system.

As will be appreciated, it is desirable that the method used for determining the composition of the mixture be relatively facile and expeditious as compared with conventional methods of quantitative chemical analysis. Since the molten mixture must be maintained at an elevated temperature, and since the handling of the mixture is attended with some danger to the person, it is also especially desirable to effect such determination with a minimum of exposure of the human operator to the mixture, and by a method that may be conveniently employed under the high temperature conditions involved.

While the aforementioned aluminum halide purification method has been particularly described with reference to the use of molten mixtures of aluminum chloride and sodium chloride, in accordance with presently preferred practice, it will be understood that the method may be practiced with molten mixtures of aluminum chloride and other alkali metal salt or salts, e.g. a ternary melt of aluminum chloride, sodium chloride, and potassium chloride. Furthermore, the aluminum subhalide distillation process may use other aluminum halides, and in particular aluminum bromide, in place of aluminum chloride; and the foregoing purification method may be employed for the purification of such aluminum bromide, using a molten salt mixture e.g. including aluminum bromide and an alkali metal salt or salts. The considerations set forth above, viz. with respect to the importance of controlling the purification operation by determinations of the proportionate composition of the molten salt mixture and the problems involved in making such determinations, apply with equal force to each of these modified operations.

A primary object of the present invention is to provide improved and convenient procedures and apparatus for determining the proportionate composition of molten salt mixtures including a substantial proportion of each of two or more salts, one of which is an alkali metal salt. Another object is to provide procedures and apparatus for determining the proportionate composition of molten salt mixtures including an aluminum halide and an alkali metal salt, suitable for use in connection with (and specifically for control of) the above described aluminum halide purification method.

A further and specific object of the present invention is to provide a system and method for determining the proportionate composition of a molten mixture af aluminum chloride and sodium chloride. Another object is to provide such a method which is relatively expeditious and simple in performance. A further object is to provide such apparatus and procedure which will afford determinations of high accuracy, for sensitive control of the above-mentioned purification system. A still further object is to provide such a method which is conveniently performable under high temperature conditions and which involves a minimum of handling or intimate contact of the human operator with such mixtures. Yet another object is to provide apparatus and procedures which are adaptable to making determinations of the proportionate composition of such mixtures in a substantially continuous manner.

In a general sense the present invention is applicable to the analysis of those salt melts (of binary, ternary, or other character), containing a substantial proportion of an alkali metal salt and a substantial proportion of a salt of a more noble metal, which form chemically stable molten mixtures at temperatures below the melting point of glass. As herein used, the term "more noble metal" refers to metallic elements more noble (i.e. in position in the electrochemical series) than alkali metals, excluding the rare earths and the classical alkaline earth metals (calcium, strontium, and barium). Examples of such "more noble metals" are aluminum, magnesium, silver, cadmium, iron, zinc, lead, copper, and nickel. Specifically, the alkali metal salt in the mixture may be the chloride, bromide, iodide or nitrate of an alkali metal, and the other salt may be the chloride, bromide, or iodide of such more noble metal, or silver nitrate; i.e. the present invention can be used to analyze those compositions of the specified salts which form stable molten mixtures as aforesaid.

For such analysis, the present invention contemplates the provision of a cell wherein the molten mixture to be tested is the electrolyte, and is exposed to a metallic electrode fabricated of the more noble metal whose ions are present in the mixture. As a particular feature of the invention, the second electrode of the cell is a glass electrode adapted to function as an electrode reversible to the alkali metal ions present in the mixture.

The glass electrode specifically includes a membrane made of glass permeable to (i.e. containing) ions of the latter alkali metal, and also includes a substance (herein termed the reference melt) of known, fixed composition, which accepts such alkali metal ions reversibly. One surface of the glass membrane is exposed to the mixture to be tested, and a second surface is exposed to the reference melt. The glass electrode is further characterized in having an inner electrode of metal which is in equilibrium with its own ions at some fixed concentration.

The reference melt may be a metallic body (very preferably molten) of the alkali metal whose ions are present in the mixture to be tested, or a suitable alloy of such alkali metal. In such case, this pure or alloyed alkali metal reference melt (which, of course, reversibly accepts the aforementioned alkali metal ions) itself constitutes the inner electrode of the glass electrode, being in equilibrium with the alkali metal ions in the glass membrane; and it is provided with a suitable electrical contact, e.g. a solid conductive body exposed to the reference melt.

Alternatively, the reference melt may be a binary, ternary or other molten salt mixture of predetermined, fixed composition, including a substantial proportion of a salt of the alkali metal whose ions are present in the mixture to be tested, and a substantial proportion of a salt of a more noble metal as defined above (not necessarily the same more noble metal as that whose ions are present in the mixture to be tested). Such molten mixture will reversibly accept the aforementioned alkali metal ions, because it contains a salt of such alkali metal. The alkali metal salt in this reference melt may be the chloride, bromide, iodide or nitrate of the latter alkali metal, and the other salt therein may be the chloride, bromide, or iodide of the more noble metal, or silver nitrate, the salts used being selected to provide a chemically stable molten mixture at the temperature at which the cell is operated, viz, a temperature (below the melting point of glass) at which the mixture to be tested is molten. With such molten salt reference melt, the inner electrode of the glass electrode is provided by a metallic body in contact with the reference melt and composed of the more noble metal whose ions are present in the reference melt, so that it is in equilibrium with its own ions in the reference melt.

In carrying forward the present process, the inner electrode (of whatever character) of the glass electrode and other electrode (viz, the metallic electrode exposed to the mixture to be tested) are connected to a suitable potentiometer adapted to measure the voltage generated in the cell between the two electrodes. It can be demonstrated mathematically that this voltage, for a given cell temperature and a fixed reference melt composition, is a unique function of the proportionate composition of the mixture to be tested, vis, the electrolyte in the cell. Thus when the temperature of the cell is ascertained, the proportionate composition of the latter mixture is immediately determinable from the voltage measurement made by the potentiometer.

To translate this voltage reading into proportionate composition, a pre-established calibration curve or table (relating voltage to composition at the ascertained cell temperature) may conveniently be employed. Such calibration data are readily prepared by measuring the voltage generated with each of a succession of salt mixtures of known composition (i.e. mixtures of the same constituent salts in successively different, predetermined proportions) used as the electrolyte in a cell, at a particular temperature and with a particular reference melt. Once established, a calibration curve or table may be used with any design or geometry of cell in analyzing unknown mixtures consisting of the same constituent salts, at the same temperature and with a reference melt of the same composition. Furthermore, a series of calibration curves prepared for several temperatures can be used to determine proportionate composition from a voltage measurement made at any cell temperature within the range of temperatures embraced by the curves, by simple interpolation. In addition, if the reference melt used is different from that of the calibration data, the voltage readings obtained will differ from those of the calibration cell only by a constant; i.e. the voltage difference corresponding to any given difference in proportionate compositions remains the same whatever reference melt is used, so that once such constant is ascertained the same calibration data may be used with the new reference melt.

The ordinary practice of the invention, therefore, does not require preparation of calibration data (once the same have been obtained for the given combination of salts, as explained above), but merely comprises establishment of a cell, including the mixture to be tested as electrolyte; ascertainment of the cell temperature; and measurement of the voltage generated, reference being made to pre-established, standard calibration data generally applicable to all cells (prepared in accordance with the present invention) for analysis of mixtures of the particular constitutent salts involved.

In such manner the apparatus and procedure of the present invention afford ready and accurate determinations of the proportionate compositions of fused salt mixtures having the character described above, particularly mixtures including very substantial proportions (e.g. 10 mol percent or more) of each of two salts (one being an alkali metal salt and the other a salt of a more noble metal), wherein the concentrations of both salts vary substantially with changes in the proportionate composition of the mixture. The advantages realized result from the employment of a glass electrode as an electrode reversible to alkali metal ions, in the fused salts. Thus, particularly high accuracy is attained because both electrodes of the present cell are sensitive to changes in the proportionate composition of the mixture under test, i.e. because a larger voltage is generated than would be generated were an inert reference electrode of unchanging potential used in place of the present glass electrode reversible to alkali metal ions, which changes in potential.

In a specific and particularly important aspect, the present invention is applicable with special advantage to the analysis of fused mixtures of aluminum halide and alkali metal salts, i.e. mixtures of the type used in the aforementioned aluminum halide gas purification method. It provides facile and highly accurate determinations of the proportionate compositions of the latter mixtures, as needed for control of the purification operation, with a high degree of safety and convenience. Accordingly, the further description hereinbelow set forth by way of specific illustration of the invention is directed to procedures and apparatus for the analysis of such aluminum halide-alkali metal salt mixtures, as particularly exemplified by the analysis of fused mixtures of aluminum chloride and sodium chloride, i.e. the mixtures presently preferred for use in the gas purification system described above.

A suitable cell arranged in accordance with the present invention for analysis of such sodium chloride-aluminum chloride fused melts comprises a reversible aluminum electrode (e.g. constituted by a suitably dimensioned rod or wire of aluminum metal) and a glass electrode (including a glass memberane permeable to sodium ions) adapted to function as an electrode reversible to sodium ions. The mixture to be tested serves as an electrolyte in the cell, in contact with the aluminum electrode and one surface of the glass membrane of the glass electrode. The second surface of the membrane is exposed to a reference melt of fixed, known composition which reversibly accepts sodium ions. As generally indicated above, the glass electrode has a metallic inner electrode in equilibrium with its own ions at a fixed concentration.

Although a variety of reference melts may be employed, one particularly convenient glass electrode arrangement includes a reference melt itself comprising a molten mixture of sodium chloride and aluminum chloride in predetermined proportions (preferably saturated with sodium chloride). The inner electrode is then provided by a rod or wire of aluminum metal exposed to the reference melt. This inner electrode, and the aluminum electrode exposed to the mixture to be tested, are connected electrically through a circuit external to the cell, with means such as a suitable electronic potentiometer connected in the circuit to measure the electromotive force generated between the aluminum electrode and the inner electrode. Current, generated by the cell, will then flow through this circuit between the aforementioned electrodes, and the voltage (which may be, e.g., in the range between 0 and several hundred millivolts) may be measured.

Such voltage generated in the cell, at any given cell temperature, is as explained above a unique function of the proportionate composition of the mixture to be tested in the cell. Thus, with the cell temperature ascertained, this proportionate composition (conveniently expressed in mol percent aluminum chloride, i.e., that percent of the total mols of salts in the mixture which constitutes mols of aluminum chloride) is immediately determinable from the measurement of voltage made with the potentiometer. Specifically, for such determination reference may be made to pre-established calibration data relating voltage (in millivolts) to proportionate composition (e.g. in mol percent aluminum chloride) for the operating temperature of the cell.

By way of example, the following discussion further illustrates the principles involved, in the specific situation of a system including an aluminum inner electrode in a sodium chloride-aluminum chloride reference melt separated by a sodium ion-permeable glass membrane from a melt to be tested, which contains the other electrode. Reference may first be made to the general equation for the electrode potential $E_M$ (measured against a suitable reference electrode) of a metal electrode immersed in a liquid bath containing free ions of the metal, viz:

$$E_M = E^\circ - \frac{RT}{nF} \text{lognat } a \qquad (1)$$

wherein
$E^\circ$ is a constant;
R is the gas constant;
T is the absolute temperature in degrees Kelvin;
n is the valence of the metal;
F is one faraday; and
$a$ is the thermodynamic activity of ions of the metal in the bath.

Since the difference of potential in a cell between two metal electrodes each immersed in a bath containing ions of its constituent metal is equal to the algebriac difference of the respective electrode potentials of the two electrodes, it will be seen that the electromotive force E generated in the cell of the present invention, between the aluminum electrode exposed to the mixture to be tested, and the inner electrode of the glass electrode, is given by the equation $$E = \frac{RT}{3F} \text{lognat } \frac{a_{Al}}{a'_{Al}} + \frac{RT}{F} \text{lognat } \frac{a'_{Na}}{a_{Na}} \qquad (2)$$

wherein
$a_{Al}$ represents the activity of the aluminum ions (dependent on the aluminum chloride concentration) in the mixture to be tested;
$a_{Na}$ represents the activity of the sodium ions (dependent on the sodium chloride concentration) in the mixture to be tested;
$a'_{Al}$ represents the activity of aluminum ions in the reference melt (here considered as consisting of a molten mixture of aluminum chloride and sodium chloride, as stated above); and
$a'_{Na}$ represents the activity of sodium ions in the reference melt.

Inasmuch as $a'_{Al}$ and $a'_{Na}$ are predetermined values (because the reference melt composition is of predetermined proportions of the constituent salts), it follows from the foregoing equation that E, for a given temperature T, is a unique function of the proportionate composition of the mixture to be tested (represented in Equation 2 by $a_{Al}$ and $a_{Na}$). It is this latter characteristic of the cell that gives it utility in the present invention in determining the proportionate composition of the salt mixtures by measurement of electromotive force. Furthermore, Equation 2 shows the voltage generated to be dependent only on the activities of the ions at a given temperature, i.e. it is independent of cell design or geometry; from this it follows that once a calibration curve is established with one cell, it may be used with any design of cell at the same temperature.

While it will be appreciated that the cell of the present invention is adaptable to a variety of designs and modes of use, one particularly advantageous embodiment comprises an arrangement of electrodes providing direct, continuous analysis of the flow of molten salt at a desired point in the aforementioned purification system, for use as a control device in such system. Specifically, the aluminum electrode and the glass electrode are introduced to the flow of the molten salt mixture in the purification system at the chosen testing point, and this flow thus acts as the cell electrolyte. The glass electrode in such case might comprise a glass bulb (serving as the membrane) containing the reference melt and inner electrode. Since the operating temperatures at given points in the purification system are substantially constant, a cell of the last-mentioned type will have the necessary temperature stability for satisfactory operation. A particular advantage of a cell of this character is that it provides substantially continuous measurement of mixture composition in the system, and thus indicates very rapidly any change in such composition, i.e. corresponding to changes in the operating conditions of the system.

Further features and advantages of the invention will be apparent from the description given below, together with the accompanying drawings, wherein:

FIG. 1 is a diagrammatic view of one embodiment of a cell prepared in accordance with the present invention;

FIG. 2 is a sectional elevational view, somewhat diagrammatic, of another embodiment of the cell of the present invention; and FIG. 3 is a cross-sectional elevational view of a further embodiment of the invention, arranged in a molten salt conduit as for continuous measurement of the proportionate composition of molten salt mixture at a selected point in an aluminum halide gas purification system of the type referred to above.

Referring first to FIG. 1, the cell therein diagrammatically illustrated is represented as enclosed in a suitable container 10 of material inactive with respect to the contained molten mixture. The interior region 11 defined by this container is shown filled to a suitable level with a molten mixture 12, consisting substantially entirely of aluminum chloride and sodium chloride, i.e. a mixture such as may be employed in the purification system for recycling aluminum chloride gas in the subhalide distillation process referred to above. An aluminum electrode 14, and a glass electrode, generally designated 15, are illustrated as immersed in this mixture, which thus constitutes the electrolyte of the cell.

The glass electrode includes a glass bulb 16, made of a suitable glass permeable to sodium ions, such as "Pyrex" glass, a borosilicate glass containing soda, and constituting the glass membrane of the glass electrode. Its thickness is selected such that the membrane has a suitably low resistance, it being understood that the resistance of the membrane is directly proportional to its thickness and that high resistance in the membrane would interfere with satisfactory operation of the cell. A suitable thickness of glass (e.g. at the lower portion of the bulb) for operation of the cell at about 200° C. is about 0.01 inch; glass of any substantially greater thickness has undesirably high resistance at this temperature. However, since the resistance of the glass decreases with increasing temperature, much thicker glass may be used when the cell is operated at higher temperatures. The minimum thickness of glass that may be employed is limited by considerations of mechanical strength and difficulty of control in fabrication.

A liquid electrolytic substance 17 is contained within the glass bulb, constituting the reference melt of the cell, e.g. a molten mixture of anhydrous aluminum chloride and sodium chloride in predetermined proportions. Immersed in this reference melt is an aluminum inner electrode 18. Thus the glass bulb 16, the reference melt 17, and the electrode 18 together form a glass electrode having the properties of an electrode reversible to sodium ions in the cell, the reference melt being entirely separated from the mixture 12 by the glass bulb 16 whose opposite surfaces, as illustrated, are respectively exposed to the mixture 12 and reference melt 17.

It will of course be appreciated, as explained above, that other suitable liquid materials could be used for the reference melt but such mixture of aluminum chloride and sodium chloride, having the same constituents as the mixtures to be tested by the cell, is particularly convenient. It is also presently preferred that proportions of constituents in the melt 17 be such that the melt is saturated with sodium chloride, or indeed contain some excess of sodium chloride, which will be present in readily observable undissolved solid form. The presence of such excess establishes that the melt is saturated, i.e. that it has the fixed, known proportionate composition of a saturated sodium chloride-aluminum chloride mixture at the temperature of the cell; in this way the requisite reference melt of predetermined composition is readily provided without the necessity of precise measurement of constituents. Furthermore, in such saturated melt the proportionate composition will not be affected if some aluminum chloride should evaporate from the melt, since in the latter event a corresponding proportion of sodium chloride will settle out of the melt as a solid and the melt will remain at the saturation composition.

A potentiometer, of a character suitable to measure the electromotive force generated in the cell, is represented at 19, connected between the two aluminum electrodes 14, 18, by electrical connections, here shown as wires 20, 21. An electronic potentiometer of the type conventionally used for pH determination with a glass electrode may be used for this purpose; such devices are well-known in the art. In addition, suitable heating means of conventional type (not shown), e.g. applied externally to the container 10, may be provided for heating the cell to maintain a constant elevated temperature therein.

The cell as thus established may then be used to analyze the proportionate composition of unknown molten mixtures of aluminum chloride and sodium chloride, e.g. in the (1) gas purification system of the subhalide distillation process above referred to. For example, a sample of molten mixture may be withdrawn from the purification system, at a point in the system at which it is desired to determine mixture composition, and introduced to the container 10 in the region 11 thereof, in contact with the electrode 14 and bulb 16. Then the voltage generated in the cell between the electrodes 14, 18, with this mixture as the electrolyte of the cell, is measured with the poteniometer 19, (the cell temperature being ascertained and conveniently being maintained at a temperature for which a calibration curve is available). By reading on such calibration curve the composition coordinate of the point on the curve corresponding to the voltage measured with the poteniometer, the proportionate composition of the unknown mixture is determined.

In measuring the electromotive force generated between the electrodes 14, 18 in the cell with the potentiometer 19, e.g. when the cell is used to determine the composition of unknown mixtures, it may be found that the voltage initially shows some tendency to drift, due to the fact that the mixture used as electrolyte in the cell has not yet attained a stable temperature. Therefore, to assure accurate determination of the voltage generated in the cell, the measurements are repeated until the voltage is found to stabilize at a substantially constant level, i.e. the same mixture is retained as electrolyte in the cell under maintained temperature conditions until such stabilization occurs.

An alternative embodiment of the cell of the present invention is illustrated in FIG. 2. As shown, the cell is enclosed within a glass vessel 25. The reference melt 26, i.e. a molten mixture of anhydrous aluminum chloride and sodium chloride in predetermined proportions (preferably saturated with sodium chloride), is contained within this vessel, and an inner electrode 27 of aluminum metal is immersed in the reference melt. To complete the cell, a glass tube or bulb 30 fabricated of a glass permeable to sodium ions (and having a suitably thin lower portion 30a of thickness determined by the considerations of mechanical strength and resistance mentioned above with reference to the bulb 16 of FIG. 1) is also immersed in the reference melt 26, the thin portion 30a of this tube serving as the memberane of the glass electrode in the cell. A sample 31 of the mixture to be tested is placed within the tube 30, i.e. separated from the reference melt 26 thereby, and an aluminum electrode 32 (illustrated as insulated in its upper portion by a glass sleeve 33) is immersed in this sample within the tube 30. Thus, in this embodiment, the glass reversible sodium electrode of the cell comprises: the glass tube 30 as the glass membrane; the reference melt 26 surrounding the tube 30 externally thereof; and the aluminum inner electrode 27 immersed in the melt 26. The sample 31 corresponds to the mixture 12 in FIG. 1, and the electrode 32 corresponds to the electrode 14 of FIG. 1. In other words, in the present embodiment the mixture to be tested is surrounded by the reference melt of the glass electrode, separated therefrom by the glass memberane; whereas in the embodiment of FIG. 1, the reference melt is surrounded by the mixture to be tested, and separated therefrom by the membrane. The electrochemical relation of cell elements is of course identical in the two illustrated embodiments. As before, when it is desired to measure the voltage generated in the cell, the inner electrode 27 and the electrode 32 are connected to a potentiometer 35 of the type referred to above, through suitable electrical connections shown as wires 36, 37.

FIG. 2 further illustrates certain details of cell structure and associated elements which contribute advantageously to the performance of the present process. Thus the vessel 25 containing the cell is illustrated as disposed within a heater vessel 40, e.g. of glass, surrounded concentrically by an aluminum sheet 41, grounded at 42, to provide electrical screening, the heater vessel 40 being shown as seated at its lower extremity in Pyrex glass wool packing 44. A sheet of mica 45, concentric of the aluminum screening sheet 41, serves as insulation; external to this, suitable heating means are provided, such as a winding 47, with heater leads 48, 49, connected to a heater power source, e.g. of conventional design, represented at 50. A conventional type of thermocouple, shown at 52 as extending downwardly within the vessel 25 and imersed in the reference melt 26, enables ascertainment of the cell temperature and also facilitates control of temperature in the cell, e.g. by adjustment of the heat power source. As will be understood, the foregoing structures are examplary of means which may be provided to heat the cell, viz for maintenance of a constant elevated temperature therein. The purpose of the screening and insulating structures is, of course, to prevent the heating instrumentality from interfering with the operation of the cell.

As illustrated, the cell also includes a tube 54, extending downwardly into the reference melt 25, having an opening at its lower end and communicating at its upper extremity with a source of inert gas, e.g. argon (not shown). During the operation of the cell, the inert gas may be bubbled through this tube 54 to agitate the reference melt. In such manner, assured even dispersion of the reference melt constituents and in particular uniformity of temperature therein may be maintained, for optimum performance of the cell in the present process. It will of course be appreciated that alternative agitating means, such as a conventional mechanical stirrer, may be employed.

With a cell of the type shown in FIG. 2, the process of the present invention is carried forward in much the same manner as that described above in connection with the cell of FIG. 1. After the reference melt has been prepared, and the temperature of the cell established and maintained at the desired value by the heating means associated therewith, e.g. source 50, leads 48 and 49 and winding 47, the cell may be used to determine the composition of unknown sodium chloride-aluminum chloride mixtures, viz, by placing samples of the unknown mixtures in the tube 30 and measuring the voltage generated therewith, with reference made to an appropriate calibration table or curve as before. Measurements for each sample are continued or repeated until the temperature of the sample stabilizes, i.e. until the voltage ceases to drift and becomes steady; the period needed for such stabilization is ordinarily between a few minutes and a half hour in length for each sample. During the operation of the cell, the heat source is adjusted as necessary (either manually or automatically, as by conventional and well-known means) to maintain substantially constant temperature conditions in the cell.

A particular advantage of the cell of FIG. 2 is found in the ease with which samples of the mixtures to be tested, i.e. as extracted from the purification system of the subhalide distillation process, may be introduced to the cell for analysis. That is to say, a sample 31 of the mixture to be tested is withdrawn from the purification system, placed in a tube 30, and immersed in the reference melt 26 with the electrode 32 inserted; if desired, a plurality of such tubes 30 containing samples 31 (e.g. from several points in the purification system) may be immersed together in the same cell, i.e. using the same reference melt and inner electrode 27, and analyzed simultaneously. In the latter mode of operation, the potentiometer 35 would be successively connected between the inner electrode 27 and the respective electrode 32 associated with each such tube 30 immersed in the reference melt, for successive measurement of the voltage generated between the inner electrode 27 and each such electrode 32.

To avoid heat losses or contamination of the reference melt from the atmosphere, the upper, open end of the glass vessel 25 may be closed with a light packing of Pyrex wool (not shown) during operation.

While the foregoing process, as illustrated by the described embodiments in connection with FIGS. 1 and 2, affords facile and accurate determination of the composition of the molten mixtures in the above-mentioned purification system, it sometimes occurs that the mixture tested is contaminated with impurities, e.g. hydrochloric acid or ferric chloride, which would interfere with the operation of the cell by causing corrosion of the aluminum electrode immersed in the mixture (i.e. electrode 14 in FIG. 1; electrode 32 in FIG. 2). It has been found that the addition of a small quantity of powdered aluminum to the mixtures before testing, with the application of gentle heat, removes these impurities (by reaction with the aluminum powder), so that the testing procedure of the cell may then be carried forward without interference; that is to say, the aluminum powder removes all impurities that would interfere with operation of the cell by reaction with the aluminum electrode. Other impurities inactive with respect to aluminum, such as magnesium chloride and calcium chloride, which may also be present in the mixtures to be tested, are of course not removed by the aluminum powder treatment. These latter impurities do not interfere with operation of the cell; however, their presence causes the voltage readings to be biased by a constant value. Hence if these extraneous substances are included in the mixtures the percentages of such impurities present must be ascertained, and reference must then be made to special calibration curves prepared for mixtures containing those percentages of inactive impurities (i.e. in order to translate voltage readings into mol percent aluminum chloride in the mixtures tested).

The process of the present invention will be further illustrated by the following example, wherein a cell of the type shown in FIG. 2 was employed:

To a glass tube 32 mm. in diameter and closed at its lower end, 70 grams of anhydrous aluminum chloride were introduced and covered with 35 grams of sodium chloride. This mixture was heated with a bunsen burner throughout the length of the tube, to effect melting and inter-mixing of the melted salts, and a small quantity of aluminum powder was added to the molten mixture to remove any residual impurities contained therein. In this way, a reference melt of aluminum chloride and sodium chloride in predetermined proportions (specifically, a melt saturated with sodium chloride) was provided. An excess of solid sodium chloride, which would not go into solution, was observed as a sediment at the bottom of the tube. An aluminum electrode ⅛ inch in diameter (made of aluminum of commercial purity) was then inserted in the reference melt, to constitute the inner electrode of the glass electrode. A bubbler tube was also inserted in the melt and argon gas was bubbled therethrough to provide agitation of the mixture; this bubbling was continued throughout the performance of the process.

The tube containing the reference melt was placed in a Pyrex tube 38 mm. in diameter, closed at its lower end, and surrounded by screening, insulation, and a heater winding as illustrated in FIG. 2. The winding was of chrome-nickel heating wire and was powered by a variable voltage transformer, manually controlled. A thermocouple was introduced to the reference melt, to measure the internal temperature of the cell, and the power source was adjusted to establish and maintain a temperature of 200° C., ±2° C., in the cell.

A Pyrex glass tube 9 mm. in diameter and sealed at its lower end was provided to contain the samples of mixture to be tested. A series of molten mixtures of sodium chloride and anhydrous aluminum chloride in predetermined proportions were prepared, a small quantity of aluminum powder being added to each to remove undesired impurities. One of these mixtures was then placed, together with an aluminum electrode 1/16-inch in diameter (made of aluminum of commercial purity), in the 9 mm. glass tube, and the latter was immersed in the reference melt. After 30 minutes the temperature of the cell was found to be steady at 200° C.±2° C. The two aluminum electrodes were connected electrically to an electronic potentiometer of the type used for pH determination with a glass electrode, equipped with a millivolt scale which could be read to 0.1 mv. The voltage developed between the electrodes was read on the potentiometer. The readings were repeated at 10 minute intervals for one hour, to insure that a stable voltage level had been attained; during this time, flow of argon was continued through the bubbler tube to provide agitation for the reference melt, and the cell temperature was maintained at 200° C.

After a stable voltage level had been attained and measured, the voltage reading was recorded, and a second melt substituted for the first in the 9 mm. tube. The voltage generated between the electrodes with this second mixture as an electrolyte was then measured as before, and the same steps were repeated for each of the remaining mixtures until a voltage reading corresponding to each had been obtained. The readings as thus obtained are given in the following table:

TABLE I

| Mixture Composition (Mol percent AlCl₃) | Voltage reading (millivolts) | Standard deviation (mv.) over 30–60 minutes |
| --- | --- | --- |
| 49.90 | 17.5 | (¹) |
| 50.29 | 265.0 | (¹) |
| 50.55 | 358.3 | ±0.5 |
| 51.10 | 409.5 | (¹) |
| 52.42 | 462.4 | ±0.8 |
| 52.7 | 463.8 | ±0.3 |
| 53.8 | 492.0 | ±0.1 |
| 55.3 | 516.7 | ±0.3 |
| 57.8 | 551.3 | ±0.2 |
| 58.2 | 556.1 | ±0.6 |
| 60.7 | 578.8 | ±0.3 |
| 63.5 | 609.9 | ±0.2 |
| 64.4 | 623.1 | ±0.5 |

¹ Not recorded.

Following the procedure indicated in the foregoing example, calibration data relating voltage to proportionate composition at 160° C., 200° C., and 250° C. have been prepared with a cell of the type shown in FIG. 2. It will be understood that the above described steps providing the information set forth in Table I above are exemplary of the preparation of these calibration data for a cell temperature of 200° C. This procedure was repeated at cell temperatures of 160° C. and 250° C. The resultant calibration data, expressed in voltage values for integral (and in some cases half-integral) increments in mol percent aluminum chloride, as obtained by interpolation from the actual experimental data (e.g. at non-integral points), are indicated in the following table:

TABLE II.—EMF OF CONCENTRATION CELL AS A FUNCTION OF TEMPERATURE AND COMPOSITION

| MOL percent AlCl₃ | 160° C. | 200° C. | 250° C. |
| --- | --- | --- | --- |
|  | Mv. | Mv. | Mv. |
| 50.0 | 92 | 92 | 103 |
| 50.5 | 352 | 342 | 340 |
| 51.0 | 403 | 402 | 400 |
| 52.0 | 450 | 445 | 448 |
| 53.0 | 479 | 474 | 476 |
| 54.0 | 501 | 497 | 496 |
| 55.0 | 518 | 514 | 513 |
| 56.0 | 532 | 528 | 528 |
| 57.0 | 543 | 540.5 | 541.5 |
| 58.0 | 554 | 553 | 556 |
| 59.0 | 565 | 564 | 569 |
| 60.0 | 576 | 575 | 581 |
| 61.0 | 587 | 585 | 591 |
| 62.0 | 598.5 | 596 | 602 |
| 63.0 | 609.5 | 606.5 | 612.5 |
| 64.0 | 621 | 617 | 623 |
| 65.0 | 633 | 627 | 633 |

To obtain calibration curves from these data, the voltage readings were plotted against mol percent aluminum chloride on a graph (for each of the aforementioned temperatures) and a curve was drawn through the plotted points.

Referring to Table II, it may be noted that since the reference melt used in preparing the calibration data was a sodium chloride-aluminum chloride mixture saturated with sodium chloride, the voltage reading would be zero for a value of mol percent aluminum chloride corresponding to a sodium chloride saturated mixture (about 49.9 mol percent aluminum chloride at 200° C.). More generally, the voltage generated in the cell is found to be zero whenever the mixture to be tested has the same proportionate composition as the reference melt; this will be clear from a consideration of Equation 2 above. It will further be noted that the variation in voltage corresponding to a variation of one mol percent aluminum chloride ranges upward from 10 mv. to several hundred mv. Since the cell of the present invention, as used with a suitable potentiometer, gives readings accurate to within ±1 mv. or better, the invention affords an analytic method of high accuracy providing determinations of mixture composition accurate to within small fractions of 1 mol percent aluminum chloride.

The calibration data set forth above may be used with any design of cell (employing a saturated sodium chloride-aluminum chloride reference melt) and for any cell temperature between 160° C. and 250° C. (by simple interpolation from the voltage values given in the table) to determine the proportionate composition of unknown molten mixtures of sodium chloride and aluminum chloride from measurement of the voltage generated in the cell. Of course, for temperatures outside the range 160° C.–250° C., other calibration data are needed, but such data, once prepared, are standard for all cells. Furthermore, as noted above, the use of a different reference melt will provide voltage readings (for any proportionate composition of mixture tested) differing from the values indicated in the calibration data only by a constant; accordingly, once the latter constant is known, the same calibration data may be used with such alternative reference melt.

A further and particularly advantageous embodiment of the invention, adapted to provide continuous analysis of the composition of molten salt mixtures, e.g. as such mixtures circulate through an aluminum chloride gas purification system of the type described above, is illustrated in FIG. 3. Specifically, the cell of FIG. 3 is shown as arranged to provide continuous analysis of molten salt passing through a conduit 52, which may be a conduit in such purification system. For access of the cell electrodes to the conduit, an opening is made in the conduit wall; this opening is surrounded by an annular base flange 53, fitted to the conduit at a sealed joint and extending outwardly from the conduit at right angles to the conduit axis. A circular gland plate 54 is bolted to the outer end of the base flange 53, separated therefrom by a suitable sealing ring indicated at 56.

The glass electrode of the cell, generally designated 58, includes a glass bulb 59 of suitable thickness to provide the glass membrane of the glass electrode, an inner aluminum electrode 61, and a reference melt 62 conveniently comprising a sodium chloride-saturated molten mixture of sodium chloride and aluminum chloride. The bulb 59 is mounted in the gland plate 54, viz, extending into the conduit 52 through an aperture in the gland plate defined by a sealing ring 64. An aluminum electrode 66, mounted in like manner in the gland plate 54, similarly extends into the conduit 52 in spaced parallel relation to the glass electrode 58. For measurement of the temperature in the conduit, a conventional thermocouple, designated 68, may also be mounted in the gland plate 54 to project into the conduit 52 adjacent the aforementioned electrodes. As will be appreciated from the foregoing description, the cell structure of FIG. 3 is gas tight, i.e. no gas can escape from the conduit 52 to the atmosphere.

The upper extremities of the electrodes 58 and 66 and the thermocouple 68, extending above the gland plate 54, may conveniently be provided with fittings, respectively designated 70, 71, and 72, for adjustment of the positions of these electrodes and thermocouple in the gland plate. These upper extremities of the electrodes and thermocouple are enclosed by an annular upper flange 74, bolted to the gland plate on the side thereof opposite the base flange 53 and closed at its upper end by a circular plate 75. Leads 77, 78, and 79, respectively connected to the inner electrode 61 of the glass electrode, the aluminum electrode 66, and the thermocouple 68, extend upwardly therefrom through pressure-tight ceramic insulators respectively designated 81, 82, and 83, mounted in the upper flange plate 75. These leads, suitably shielded, further extend through and beyond a cap 85 which is mounted on the upper surface of the plate 75 as by a wing nut 87 and threaded post 88. The respective leads 77, 78 from the glass electrode and aluminum electrode are connected to a suitable potentiometer 80, as in the case of the cells of FIGS. 1 and 2 described above.

With this arrangement of elements, the glass bulb 59, the aluminum electrode 66, and the thermocouple 68 are exposed to the continuous flow of molten salt mixture (i.e. sodium chloride and aluminum chloride) passing through the conduit 52, so that the latter mixture constitutes the electrolyte of the cell. The voltage generated between the electrodes 58, 66 is measured continuously by the potentiometer 80. Since the temperature of the molten salt flow through the conduit 52 is ordinarily substantially constant, no delay in measurement is required (as in the case of the cells of FIGS. 1 and 2 above) for temperature stabilization. Accordingly, the measurement of voltage on the potentiometer provides a continuous, accurate determination of the proportionate composition of the salt mixture passing through the conduit. From such voltage reading, the actual percentage composition of the mixture in the conduit may of course be determined at once by reference to a standard calibration curve as mentioned above, the temperature of the molten salt mixture being ascertained by the thermocouple 68.

In other words, as before, performance of the present process with the cell of FIG. 3 essentially involves establishment of the cell, ascertainment of the cell temperature, and measurement of the generated voltage. In such manner there is provided facile and continuous analysis of the proportionate composition of the molten salt mixture at a chosen point in the aforementioned purification system, to afford continuous, close control of the system e.g. in the manner previously explained.

As mentioned above in connection with the cell of FIG. 2, the molten salt mixture to be tested may sometimes contain impurities such as hydrochloric acid or ferric chloride which would interfere with the operation of the cell by reaction with the aluminum electrode 66. To indicate the presence of these impurities, a small tungsten electrode 90 may be mounted in the gland plate 54 to extend into the conduit 52 for contact with the flow of molten salt therein, and held at a potential about 0.4 volt anodic to the aluminum electrode 66, being connected through a suitable and e.g. conventional sensing and warning circuit 92. No current flows through the tungsten electrode unless such undesired impurities are present in the mixture; when these impurities are found, current flows in the tungsten electrode and the latter may be used to actuate some suitable warning system so that the mixture may be freed of the impurities before proceeding further with the analysis.

The process and apparatus of the present invention, as embodied in the several cell structures described above, may be employed at a wide range of temperatures and for the determination of a wide range of mixture compositions, in the analysis of sodium chloride-aluminum chloride mixtures. The minimum aluminum chloride content which can be attained in a sodium chloride-aluminum chloride molten mixture is, of course, that at which the mixture is saturated with sodium chloride; this value ranges from about 50 mol percent aluminum chloride at 150° C. to about 42.5 mol percent aluminum chloride at 600° C., the proportion of sodium chloride in a saturated mixture varying monotonically with the temperature of the mixture. The present invention can readily analyze such saturated or near-saturated mixtures, indeed with especially great accuracy, since (as will be apparent from Table II above) the difference in voltage corresponding to a difference of 1 mol percent in aluminum chloride content increases as the composition of the mixture approaches saturation with sodium chloride. In other words, the lower limit of aluminum chloride content which can be measured with the present procedure and apparatus is coequal with the lowest attainable aluminum chloride content in the sodium chloride-aluminum chloride melts.

In the cells of FIGS. 1 and 2, wherein the molten mixture to be tested is exposed to the air, the upper limit of aluminum chloride concentration which can be measured is that concentration at which aluminum chloride evaporates from the mixture in such amounts as to cause a significant and continuous change in the proportionate composition of the mixture. When this latter concentration is reached, the voltage generated in the cell is observed to drift as a result of the change in mixture composition. The value of aluminum chloride concentration at which such drift occurs is inversely related to temperature, and is somewhat lower than the boiling point-concentration of the mixture at a given temperature; for example, at 200° C., the upper limit of aluminum chloride concentration measurable by the process of the present invention in an open cell is about 65 mol percent aluminum chloride. However, in a closed system such as that of FIG. 3, wherein evaporation from the mixture to be tested is impossible, it is possible to analyze mixtures having a much greater proportion of aluminum chloride, and in general there is no upper limit on the aluminum chloride concentration that can be measured.

The maximum temperature at which the cell may be operated is that at which the glass membrane begins to soften, e.g. about 600° C. for the Pyrex membrane referred to above. The minimum temperature at which a sodium chloride-saturated aluminum chloride-sodium chloride reference melt may be used is the freezing point of such reference melt, about 153° C. However, at temperatures below this latter value, other reference melts may be employed, e.g. sodium chloride-aluminum chloride mixtures saturated either with sodium aluminum chloride (i.e. NaAlCl$_4$) or with aluminum chloride and containing an excess of the saturating salt in solid form. The latter reference melts may be used for analysis of the molten salt mixtures at any temperature above the eutectic temperature of sodium chloride-aluminum chloride mixtures (i.e. about 110° C.).

While the foregoing embodiments of the invention have been described with reference to the use of an aluminum chloride-sodium chloride reference melt in conjunction with a metallic aluminum inner electrode, other glass electrode arrangements may be employed for the analysis of molten mixtures of sodium chloride and aluminum chloride. For example, a molten mixture of sodium chloride, aluminum chloride and silver chloride may be employed as the reference melt, with an inner electrode (for this particular mixture) of silver. More generally, any binary or other molten salt mixture which is chemically stable at the operating temperature of the cell, and which contains a substantial proportion of sodium chloride, bromide, iodide or nitrate (so that it reversibly accepts sodium ions) together with a substantial proportion of the chloride, bromide, or iodide of a more noble metal (as defined above), or silver nitrate, may be used, in conjunction with an inner electrode of the more noble metal. Again, as mentioned above, the reference melt may consist of pure metallic sodium or a suitable lead-sodium alloy, very preferably in molten form; such melt, owing to the low melting point of sodium, (or even a solid sodium body as reference melt) may be employed for operation at low temperatures. In the case of such metallic reference melt, the reference melt itself comprises the inner electrode of the glass electrode, and is provided with a suitable electrical contact such as a solid conductive element exposed to the molten body. The latter electrical contact may conveniently be an aluminum wire immersed in the liquid sodium; the use of aluminum avoids the possibility of generating thermal voltages.

The application of the present invention to the analysis of molten salt mixtures other than aluminum chloride-sodium chloride melts may be illustrated by consideration of the analysis of other aluminum halide-containing melts, e.g. such as are suitable for use in the previously described gas purification method. Thus, to determine the proportionate composition of a binary molten mixture of aluminum chloride and potassium chloride, using a cell of the type shown in FIG. 1, the mixture to be tested constitutes the electrolyte 12, and is exposed as before to an aluminum electrode 14 and a glass electrode 15. The bulb 16 (providing a suitably thin, i.e. low-resistance, glass membrane) is fabricated of a glass permeable to potassium ions. For this particular case of a mixture containing potassium ions, the glass should contain no sodium ions, becaue the sodium ions if present in the glass would conduct better than the potassium ions. A suitable potassium glass composition (K$_2$O·SiO$_2$) is described by G. D. Rieck and J. M. Stevels, J. Soc. Glass Technol., 35, 284T–288T (1951). More generally, for the analysis of any molten salt mixture to which the present invention applies, the glass membrane used must be permeable to the alkali metal ion present in the mixture; e.g. if the mixture contains a lithium salt, a suitable lithium glass should be used, one suitable lithium glass composition (Li$_2$O·SiO$_2$)

being disclosed by Rieck and Stevels in the above-mentioned article.

Referring further to the analysis of aluminum chloride-potassium chloride melts as with the cell of FIG. 1, the reference melt 17 should reversibly accept potassium ions, and may be a molten salt mixture e.g. including potassium chloride and aluminum chloride in predetermined proportions, with an inner electrode 18, of aluminum. Alternative reference melts, such as other potassium ion-containing molten salt mixtures, or pure or alloyed metallic potassium (very preferably molten, and serving also as the inner electrode), may be employed, in accordance with the general criteria for glass electrodes and reference melts set forth above. To determine the proportionate composition of the aluminum chloride-potassium chloride mixture under test, the inner electrode 18 and the aluminum electrode 14 are connected to a potentiometer 19 of the type previously described; with the cell temperature ascertained, the voltage generated in the cell is measured. This voltage, a unique function of the proportionate composition of the mixture to be tested (at a given cell temperature) is translated into proportionate composition by reference to appropriate calibration data prepared for aluminum chloride-potassium chloride mixtures.

In like manner, other aluminum halide-alkali metal salt melts may be analyzed. For example, to determine the proportionate composition of a molten mixture of aluminum bromide and sodium bromide (or sodium chloride) with the cell of FIG. 1, the mixture to be tested is the electrolyte 12; the glass membrane 16 is permeable to sodium ions, e.g. fabricated of a "Pyrex" type glass as previously described; and the reference melt 17 may be e.g. a molten mixture of aluminum chloride and sodium chloride in predetermined proportions, with electrode 14 and inner electrode 18 both fabricated of aluminum.

The present process and apparatus may also be used for the analysis of ternary mixtures, i.e. molten mixtures of three salts, as specifically exemplified by a molten mixture of aluminum chloride, sodium chloride, and potassium chloride, the latter mixture being a useful alternative to sodium chloride-aluminum chloride mixtures in the gas purification process previously discussed. For such purpose, a cell including the ternary mixture as electrolyte, an aluminum electrode in contact therewith, and a glass electrode reversible to sodium ions, would be used. Specifically, the glass electrode may be of the type described above in connection with the analysis of sodium chloride-aluminum chloride melts, viz, comprising a glass membrane permeable to sodium ions and a reference melt that reversibly accepts sodium ions, e.g. a sodium chloride-saturated mixture of sodium chloride and aluminum chloride, used in conjunction with an aluminum inner electrode. The voltage generated in the cell (as measured with a potentiometer) will be a unique function of the proportions of the three salts present in the mixture, for a given cell temperature. To translate this voltage into proportionate composition, a calibration curve prepared for a specific fixed ratio of sodium chloride content to potassium chloride content may be employed, if the sodium chloride-potassium chloride ratio of the mixture is constant and the only variable is the ratio between aluminum chloride content and total content of alkali metal chlorides. Alternatively, if the sodium chloride-potassium chloride ratio of the mixture to be tested varies, such ratio may be measured by independent means, and an appropriate calibration curve then employed to determine from the voltage reading the proportionate content of aluminum chloride in the mixture.

It is to be understood that the invention is not limited to the specific features and embodiments hereinabove set forth, but may be carried out in other ways without departure from its spirit.

I claim:

1. For use with a molten salt mixture including a salt of an alkali metal and a salt of a more noble metal, wherein the concentration of said more noble metal salt is equal to at least about 10 mol percent, in a method of determining changes in concentration of said more noble metal salt in said mixture, the steps of
  (a) successively interposing a plurality of samples of said mixture varying in concentration of said more noble metal salt between an electrode fabricated of said more noble metal and one side of a glass membrane permeable to ions of said alkali metal, while
  (b) providing a second electrode in electrical connection with the other side of said membrane, to constitute a cell comprising said electrodes, said second electrode being arranged for electrical connection with the successively interposed samples of said mixture by transport of said alkali metal ions through the glass membrane, said membrane and second electrode being arranged to maintain said membrane and second electrode in equilibrium respecting said alkali metal ions while permitting reversible transport of said alkali metal ions through the membrane, and
  (c) making successive measurements of the difference of potential between the electrodes, at an ascertained temperature, while said samples of mixture are successively interposed between said first-mentioned electrode and said glass membrane.

2. A method according to claim 1, wherein the step of providing a second electrode in electrical connection with the other side of said membrane comprises providing a second molten salt mixture including a salt of said alkali metal and a salt of a more noble metal in contact with said other side of said membrane and with a second electrode fabricated of said last-mentioned more noble metal, said second molten salt mixture being saturated with said last-mentioned alkali metal salt.

3. A method according to claim 1, wherein the step of providing a second electrode in electrical connection with the other side of said membrane comprises providing a second molten salt mixture including more noble metal salt and a salt of said alkali metal in predetermined proportions in contact with said other side of said membrane and with a second electrode fabricated of said more noble metal.

4. In a method of determining change in concentration of an aluminum salt in a molten salt mixture including said aluminum salt and a salt of an alkali metal, wherein the concentration of said aluminum salt is equal to at least about 10 mol percent, the steps of
  (a) successively interposing a plurality of samples of said mixture varying in concentration of said aluminum salt between an aluminum electrode and one side of a glass membrane permeable to ions of said alkali metal, while
  (b) providing a second electrode in electrical connection with the other side of said membrane, to constitute a cell comprising said electrodes, said second electrode being arranged for electrical connection with the successively interposed samples of said mixture by transport of said alkali metal ions through the glass membrane, said membrane and second electrode being arranged to maintain said membrane and second electrode in equilibrium respecting said alkali metal ions while permitting reversible transport of said alkali metal ions through the membrane, and
  (c) making successive measurements of the difference of potential between the electrodes, at an ascertained temperature, while said samples of mixture are successively interposed between said first-mentioned electrode and said glass membrane.

5. A method according to claim 4, wherein said step of providing a second electrode in electrical connection with the other side of said membrane comprises providing a second molten salt mixture including a salt of said alkali metal and a salt of a more noble metal in contact with said other side of said membrane and with a second electrode fabricated of said more noble metal, said second mixture being saturated with said last-mentioned salt of said alkali metal.

6. A method according to claim 4, wherein said step of providing a second electrode in electrical connection with the other side of said membrane comprises providing a second molten salt mixture including a salt of said alkali metal and an aluminum salt in predetermined proportions in contact with said other side of said membrane and with a second aluminum electrode.

7. A method according to claim 6, wherein each of said salts is a halide and wherein said second molten mixture is saturated with halide of said alkali metal.

8. A method according to claim 7, wherein the step of successively interposing a plurality of samples of said first-mentioned mixture between said first-mentioned electrode and said membrane comprises exposing said first-mentioned electrode and said one side of said membrane to a flow of said first-mentioned mixture advancing past said first-mentioned electrode and said membrane so that successive portions of said flow are exposed thereto.

9. For use with a molten salt mixture including a salt of an alkali metal and a salt of a more noble metal, wherein the concentration of said more noble metal salt is at least about 10 mol percent, a method for controlling the concentration of said more noble metal salt in said mixture, comprising the steps of
  (a) interposing a body of said mixture between an electrode fabricated of said more noble metal and one side of a glass membrane permeable to ions of said alkali metal,
  (b) providing a second electrode in electrical connection with the other side of said membrane, to constitute a cell comprising said electrodes, said second electrode being arranged for electrical connection with said molten mixture by transport of said alkali metal ions through the glass membrane, said membrane and second electrode being arranged to maintain said membrane and second electrode in equilibrium respecting said alkali metal ions while permitting reversible transport of said alkali metal ions through the membrane,
  (c) measuring the difference of potential between the electrodes at an ascertained temperature, and
  (d) adjusting the composition of said molten salt mixture in accordance with the aforesaid measurement of said difference of potential, to provide a concentration of said more noble metal salt in said mixture at a predetermined value.

10. A method of controlling the concentration of an aluminum salt in a molten salt mixture including a salt of an alkali metal and said aluminum salt, wherein the concentration of said aluminum salt is at least about 10 mol percent, comprising the steps of
  (a) interposing a body of said mixture between an aluminum electrode and one side of a glass membrane permeable to ions of said alkali metal,
  (b) providing a second electrode in electrical connection with the other side of said membrane, to constitute a cell comprising said electrodes, said second electrode being arranged for electrical connection with said molten mixture by transport of said alkali metal ions through the glass membrane, said membrane and second electrode being arranged to maintain said membrane and second electrode in equilibrium respecting said alkali metal ions while permitting reversible transport of said alkali metal ions through the membrane,
  (c) measuring the difference of potential between the electrodes at an ascertained temperature, and
  (d) adjusting the composition of said molten salt mixture in accordance with the aforesaid measurement of said difference of potential, to provide a concentration of said aluminum salt in said mixture at a predetermined value.

11. A method according to claim 10 wherein said aluminum salt is selected from the class consisting of aluminum chloride, aluminum bromide and aluminum iodide, and wherein said alkali metal salt is selected from the class consisting of alkali metal chlorides, bromides and iodides.

12. A method of controlling the concentration of an aluminum halide in a molten salt mixture including said aluminum halide and a halide of an alkali metal, wherein the concentration of said aluminum halide is at least about 10 mol percent, as said molten salt mixture is advanced in substantially continuous flow past a given point, comprising the steps of
  (a) interposing successive samples of said flow passing said given point between an aluminum electrode and one side of a glass membrane permeable to ions of said alkali metal, while
  (b) providing a second electrode in electrical connection with the other side of said membrane to constitute a cell comprising said electrodes, said second electrode being arranged for electrical connection with the successively interposed samples of said mixture by transport of said alkali metal ions through the glass membrane, said membrane and second electrode being arranged to maintain said membrane and second electrode in equilibrium respecting said alkali metal ions while permitting reversible transport of said alkali metal ions through the membrane,
  (c) making successive measurements of the difference of potential between the electrodes, at an ascertained temperature, while said samples of mixing are successively interposed between said first-mentioned electrode and said glass membrane, and
  (d) adjusting the composition of said molten salt mixture in accordance with departures of the successive measurements of difference of potential from a predetermined value corresponding to a preselected value of concentration of said aluminum halide in said mixture, to maintain the concentration of said aluminum halide in said mixture at said preselected value.

13. A method according to claim 12, wherein the step of providing a second electrode in electrical connection with the other side of said membrane comprises providing a second molten salt mixture including a halide of said alkali metal and an aluminum halide in contact with said other side of said membrane and with a second aluminum electrode, said second molten salt mixture being saturated with said last-mentioned alkali metal halide.

14. A method according to claim 12, wherein the step of interposing succesive samples of said first-mentioned mixture between said first-mentioned electrode and said membrane comprises continuously exposing said first-mentioned electrode and said one side of said membrane to said flow at said given point, and wherein the step of measuring the difference in potential between the electrodes comprises making successive measurements of said difference of potential as said flow advances past said given point.

15. For use with a molten salt mixture including a salt of an alkali metal and a salt of a more noble metal, wherein the concentration of said more noble metal salt is equal to at least about 10 mol percent, the method of calibrating an electrolytic cell for measurement of the concentration of said more noble metal salt in said mixture, comprising the steps of
  (a) successively interposing a plurality of samples of said mixture having respectively different, known concentrations of said more noble metal salt, between an electrode fabricated of said more noble metal and one side of a glass membrane permeable to ions of said alkali metal, while
  (b) providing a second electrode in electrical connection with the other side of said membrane, to constitute a cell comprising said electrodes, said second electrode being arranged for electrical connection with the successively interposed samples of said mixture by transport of said alkali metal ions through the glass membrane, said membrane and second electrode being arranged to maintain said membrane and second electrode in equilibrium respecting said alkali metal ions while permitting reversible transport of said alkali metal ions through the membrane, and
  (c) measuring and recording the difference of potential between the electrodes at an ascertained temperature while each of said samples of mixture is interposed between said first-mentioned electrode and said glass membrane.

16. A method of calibrating an electrolytic cell for determining the concentration of an aluminum salt in a molten salt mixture including said aluminum salt and a salt of an alkali metal, wherein the concentration of said aluminum salt is equal to at least about 10 mol percent, comprising the steps of
  (a) successively interposing a plurality of samples of said mixture having respectively different, known concentrations of said aluminum salt between an aluminum electrode and one side of a glass membrane permeable to ions of said alkali metal, while
  (b) providing a second electrode in electrical connection with the other side of said membrane, to constitute a cell comprising said electrodes, said second electrode being arranged for electrical connection with the successively interposed samples of said mixture by transport of said alkali metal ions through the glass membrane, said membrane and second electrode being arranged to maintain said membrane and second electrode in equilibrium respecting said alkali metal ions while permitting reversible transport of said alkali metal ions through the membrane, and
  (c) measuring and recording the difference of potential between the electrodes at an ascertained temperature while each of said samples of mixture is interposed between said first-mentioned electrode and said glass membrane.

17. In a conduit for conveying a flow of a molten mixture of a halide of an alkali metal and a halide of aluminum, a cell for measuring the composition of said mixture, comprising, in combination, an aluminum electrode extending into said conduit for contact with said flow, a glass bulb providing a glass membrane permeable to ions of said alkali metal and extending into said conduit in spaced relation to said aluminum electrode for contact with said flow, a body of molten mixture of a halide of said alkali metal and a halide of aluminum in predetermined proportions disposed within said bulb, a second aluminum electrode immersed in said last-mentioned body, a tungsten electrode extending into said conduit in spaced relation to said first-mentioned aluminum electrode, and means for maintaining said tungsten electrode about 0.4 volt anodic to said first-mentioned aluminum electrode, for detection of impurities in said flow.

References Cited

UNITED STATES PATENTS

| | | | |
|---|---|---|---|
| 2,728,656 | 12/1955 | Neher | 204—195 |
| 2,886,771 | 5/1959 | Vincent | 204—195 |
| 3,151,052 | 9/1964 | Arthur et al. | 204—195 |

OTHER REFERENCES

Bockris et al., J. of Scientific Instruments, vol. 33, November 1956, pp. 438 and 439.

J. of Gen. Chem. (U.S.S.R.), vol. 10 (1940), pp. 1858–1864.

Khim., Akad. Nauk. U.S.S.R., vol. 7 (1940), pp. 159–172.

Verdieck et al., J. of Physical Chemistry, vol. 46, 1942, pp. 344–352.

Verdieck et al., J. of Physical Chemistry, vol. 48, 1944, pp. 268–279.

JOHN H. MACK, *Primary Examiner.*

T. TUNG, *Assistant Examiner.*